United States Patent [19]  [11] 3,929,602
Kaetsu et al.  [45] Dec. 30, 1975

[54] LOW TEMPERATURE IRRADIATION OF VITRIFIABLE MIXTURES OF UNSATURATED MONOMERS

[75] Inventors: Isao Kaetsu; Akihiko Ito, both of Takasaki; Koichiro Hayashi, Sapporo, all of Japan

[73] Assignee: Japan Atomic Energy Research Institute, Tokyo, Japan

[22] Filed: Dec. 8, 1972

[21] Appl. No.: 313,396

[30] Foreign Application Priority Data
Dec. 10, 1971 Japan.................................. 46-99472

[52] U.S. Cl................... 204/159.22; 204/159.23
[51] Int. Cl.$^2$................... C08F 2/48; C08F 2/54
[58] Field of Search.................... 204/159.22, 159.15

[56] References Cited
UNITED STATES PATENTS
3,679,562  7/1972  Tabata et al................... 204/159.22

FOREIGN PATENTS OR APPLICATIONS
233,173  6/1959  Australia........................ 204/159.22

OTHER PUBLICATIONS

Kaetsu et al. *Journal of Polymer Science*: Part A-1, Vol. 10, pp. 2203–2211 (May 1972).

*Primary Examiner*—Murray Tillman
*Assistant Examiner*—Thurman K. Page
*Attorney, Agent, or Firm*—Browdy and Neimark

[57]  ABSTRACT

A specific mixture containing at least one polymerizable unsaturated monomer which is not vitrifiable by itself can advantageously be polymerized by irradiating the mixture at a temperature not higher than 100°C above glass transition temperature of the mixture with an ionizing radiation and/or a light.

12 Claims, 6 Drawing Figures

LOW TEMPERATURE IRRADIATION OF VITRIFIABLE MIXTURES OF UNSATURATED MONOMERS

BACKGROUND OF THE INVENTION

In the industrial scale polymerization of a vinyl monomer by means of a free radical mechanism, the polymerization rate is generally desirable to be as large as possible. However, there is an important problem in controlling the temperature of polymerization when a large polymerization rate is employed. If the polymerization can be carried out at a low temperature, a violent uncontrolled reaction in the polymerization can easily be overcome; it is possible to control the temperature of an industrial scale polymerization at a large polymerization rate.

It has been known that an ionizing radiation or light can advantageously be employed for a polymerization at low temperature since very little energy is required for initiation of polymerization reaction. However, low temperature polymerization utilizing radiation or light is not generally employed, since most of polymerizable monomers are easily crystallized at low temperature — and in the crystallized state, molecular movement is restricted and the rate of propagation is extremely low — and no or very little rate of polymerization is obtained.

When solution polymerization is carried out using a solvent which is not easily frozen at lower temperature, the concentration of the monomer is inevitably low. The activation energy required for propagation reaction in polymerization is generally greater than the activation energy for termination of reaction, and the decrease in the rate of propagation is greater than the rate of termination of reaction. Thus, the rate of solution polymerization at low temperature is generally very low.

Those skilled in the art would note that it is not compatible to increase the polymerization rate and simultaneously to control the polymerization temperature in the conventional process which comprises only cooling a polymerizable monomer and effecting polymerization at low temperature.

The present inventors had found that a specific monomer such as a polymerizable ester of an acrylic acid derivative and an alcohol can easily take vitreous state and be polymerized at a larger rate of polymerization when it is cooled below a temperature about 70°C higher than its glass transition temperature but not lower than the glass transition temperature. These inventions were filed as patent applications; Japanese patent application No. 116643/1970, U.S. patent Ser. No. 208,399 filed on Dec. 15, 1971 and the like.

However, a monomer which takes a supercooled state by itself and forms a semisolid or vitreous state requires a specific and limited molecular structure. Most of polymerizable monomers on the market can not take a vitreous state by itself. Therefore, the above-mentioned invention cannot be applied to these polymerizable monomers on the market. The present invention is, in an aspect, an improvement on the above-mentioned invention. Those skilled in the art would appreciate the features of this invention further in detail by referring to the above-mentioned invention.

SUMMARY OF THE INVENTION

The main object of this invention is to provide a process for vitrifying a polymerizable monomer which is not vitrifiable by itself and efficiently polymerizing the resulting vitreous or semisolid system at a specific low temperature range.

According to the inventors' researches, it has been made clear that the critical factor for vitrification of a given monomer system is the difference in temperature between the melting point and glass transition point of the monomer system. The monomer system becomes vitrifiable when the difference in temperature is smaller than a specific value. The smaller the temperature difference, more easily the monomer system vitrifies and forms a stable supercooled state. It has also been found that the mixed system of at least two materials which are not vitrifiable by itself exhibits the fall in melting point and the decrease in temperature difference between melting point and glass transition point. In most cases, the temperature difference is smaller than a specific value and the mixed system becomes vitrifiable.

In a general mixed system, a composition which provides maximum fall in melting point is at the eutectic point of the mixed system, and the temperature difference between melting point and glass transition point is generally minimum at the eutectic point. Therefore, the specific composition which is vitrifiable is considered to be a mixture having some composition range in the vicinity of the eutectic point of the mixed system. The range in the vicinity of eutectic point is represented by the specific value of temperature difference between melting point and glass transition point of the mixed system, which is about 70°C or lower. In other words, the mixed system is vitrifiable when the temperature difference between melting point and glass transition point in the vicinity of its eutectic point is about 70°C or lower.

This invention has been accomplished based on the above-mentioned law discovered by the present inventors. Very wide range of multi-component monomers can advantageously be polymerized according to the unexpected mechanism and factors of vitrification of this invention.

DESCRIPTION OF THE PREFERRED EMBODIMENTS

Figure 1:
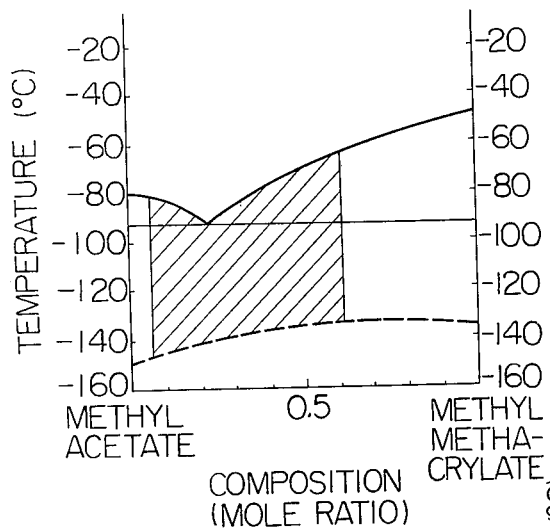
FIGS. 1 – 6 are the constitutional diagrams showing the relations between melting points and glass transition points of the typical two-component mixed systems, in which — line represents melting point and — line represents glass transition point.

The process of this invention comprises selecting two or more organic compounds, (i) at least one of which is a polymerizable monomer, (ii) which are not vitrifiable by itself and (iii) which form a mixed composition having the temperature difference between melting point and glass transition point of about 70°C or lower, uniformly mixing the compounds so that they form a composition having such temperature difference, cooling the mixed system, and keeping the mixed system at a desired temperature not higher than about 100°C above glass transition temperature of the system. Generally, the vitrifiable system takes a very viscous state at a temperature higher than the estimated melting point of the system.

In this process, it is essential that at least one component of the mixed system is a polymerizable monomer (condition I) and the temperature difference between melting point and glass transition point of the mixed system is about 70°C or lower (condition II). For example, it is possible to add a third substance selected from a polymerizable monomer and a nonpolymerizable compound to the system which satisfies the above conditions I and II comprising a polymerizable monomer and a nonpolymerizable compound, unless the addition destroys the condition II of the system. It is also possible to add a polymerizable monomer to the mixed system comprising nonpolymerizable compounds, unless the addition destroys the condition II of the system. Generally, in a mixed system, the increase in species of components lowers the melting point of the system. Therefore, the supercooled stability of the system which satisfies the above condition II is generally enhanced by addition of a third component without impairing the above condition II of the system.

According to the inventors' recognition, most of the compounds having the temperature difference between melting point and glass transition point of 70° – 100°C would provide a mixed composition having the temperature difference of not higher than 80°C which satisfies the above condition II. Based on this recognition, those skilled in the art can select the suitable components of the mixed system by measuring melting points and glass transition points of the various mixed composition and drawing the constitutional diagram of the mixed system.

The polymerizable monomers which are difficult to vitrify by itself and employed as at least one component in this invention typically include: styrene, methyl methacrylate, methyl acrylate, ethyl acrylate, butyl acrylate, butyl methacrylate, vinyl toluene, vinyl pyridine, vinyl pyrrolidone, vinyl carbazole, acrylic acid, acrylic amide, methacrylic acid, methacrylic amide, methylolated acrylic amide, methylene bis-acrylic amide, methacrylonitrile, acrylonitrile, vinyl acetate, vinyl chloride, vinylidene chloride, butadiene, acetylene, isoprene, isobutylene, divinyl benzene, triallyl cyanurate, diallyl maleate, diallyl itaconate, itaconic acid, phthalic anhydride, acenaphthylene, vinyl stearate, vinyl laurate, isopropenyl methyl ketone, vinyl methyl ketone and homologues of these monomers.

The range of temperatures at which polymerization is conducted is from the glass transition temperature of the polymerization system to a temperature higher than the glass transition temperature by 100°C. The preferred temperature range is generally 30° – 70°C above the glass transition temperature.

In this connection, it must be understood that glass transition temperature is not a constant temperature throughout the course of polymerization. There is a relation that when the polymerization yield is 0%, the glass transition temperature of the polymerization system is that of the used monomer, and when the polymerization yield is 100%, the glass transition temperature is that of the formed polymer. That is, the glass transition temperature changes as polymerization proceeds. Therefore, when there is a considerable difference between the glass transition temperature of the monomer and that of the polymer product, the temperature of a polymerization system will have to be raised as polymerization proceeds. Thus the term "glass transition temperature of a polymerization system" in the following description and claims must be interpreted in this sense.

Considerably strong natural light and visible and ultraviolet lights from high pressure mercury lamps are employable for the process of this invention. Ionizing radiations utilized in the process of this invention include alpha-rays, beta-rays, gamma-rays, electron beams, X-rays, etc. that is, all the radiations which ionize substances can be employed. Wave length of effective lights ranges from 1,900 A to 7,000 A. The intensity of the light to be employed is determined by considering polymerization conditions and scale of reaction vessels. Dose and dose rate are determined in accordance with polymerization conditions and desired yield and degree of polymerization. However, the usually employed dose rate is about $10^2 - 10^{10}$ roentgens/hr, preferably $10^3 - 10^9$ roentgens/hr. The dose is usually in the range of about $10^2 - 10^7$ roentgens.

Further, to a polymerization system, a non-polymerizable substance which has a greater G-value or quantum yield for radical formation or promotes formation of free radicals by energy transfer, such as trichloroethylene, carbon tetrachloride, water, ethanol, isopropanol, etc. can be added in an amount of 1 – 20%, preferably 5 – 10% of the system.

According to use of the finished products, various kinds of fillers such as wood flour (wood dust), talc, glass fiber, pulverized ores, asbestos, and the like can be added to polymerization systems. Also it is possible to provide a polymerization system with a complicated structure which will give laminated material, solid material having void spaces dispersed therein, etc., after polymerization is finished.

A polymerization rate several to several hundreds times that of liquid phase or non-viscous solution polymerization at lower temperature is achieved, and a polymerization rate far beyond the rate of room temperature polymerization can be attained if suitable conditions are selected. And control of the reaction is easily effected because the polymerization is conducted at a lower temperature and the reaction rate and temperature are automatically controlled to some extent by the mechanism explained hereinafter. This is a feature of this invention.

Polymerization is conducted at lower temperatures at which monomers exist in the shrunken semi-solid state; therefore volume shrinkage when a monomer is converted to a solid polymer is very small. Solid articles almost free from defects due to volume contraction can be produced. This is another feature of this invention which provides an advantageous method of molding polymerization.

When an ionizing radiation is employed, resin materials or articles which have complicated inside structure such as laminated plates, wood plastics, etc., can be produced by the process of this invention.

It has been found that when the polymerization is effected by irradiation of an ionizing radiation or a light at the lower temperature in accordance with this invention, the maximum polymerization rate may be in a temperature range 30° – 70°C higher than the glass transition temperature, particularly around the temperature 50°C higher than that. The minimum polymerization rate lies in a range 100° – 120°C higher than the glass transition temperature. This phenomenon is caused by the competition between the propagation promoted by molecular movement and the termination reaction promoted by diffusion of polymer radicals as mentioned above.

When a polymerization system of this invention is cooled, viscosity of the system steeply increases in a temperature range between a temperature higher than the glass transition temperature by 100°C and the glass transition temperature, especially in a range between a temperature higher than the glass temperature by 70°C and a temperature higher than the glass transition temperature by 30°C. Thus the rate of the termination reaction rapidly decreases, which means that the polymerization rate rapidly increases. This means on the contrary that in this temperature range, even a slight rise in the reaction temperature causes slow-down of the polymerization rate.

When polymerization is conducted at a temperature in this range, if the polymerization exceedingly proceeds and the temperature rises, viscosity of the system rapidly decreases and thus the rate of the termination reaction increases, which means the rate of the polymerization reaction decreases.

Therefore, automatic control of reaction rate and temperature is spontaneously effected to some extent. This is a remarkable feature of the process of this invention.

The polymerization of this invention can advantageously be carried out by using a high dose rate irradiation apparatus such as an electron accelerator. In the prior art polymerization, efficiency of initiation reaction is low because of recombination of formed monomer radicals, and polymerization rate does not increase in proportion to the dose rate but is proportional to approximately 1/2 power (square root) of dose rate. In contrast in this invention, recombination of monomer radicals are inhibited by high viscosity of the system and radiation energy is efficaciously utilized and the polymerization rate increases in proportion to the dose rate per se.

The polymerization of the present invention is typically carried out by the following two ways; the mixed system is irradiated with an ionizing radiation and/or light at a temperature not higher than 100°C above the glass transition point of the system or the mixed system is irradiated with an ionizing radiation and/or light at a temperature not higher than the glass transition point of the system and then kept at a temperature not higher than 100°C above the glass transition temperature.

The polymerizable unsaturated organic monomer or nonpolymerizable organic compound (medium) employed in this invention is a general-type organic compound which is not vitrifiable by itself and most of which is commercially available. Generally, from the monomer or compound (medium) employed in this invention are excluded a monomer and a compound which have strong polar group such as two or more hydroxy groups in the molecule or which is an organic compound constituted of main chain having about 6 – 10 carbon atoms and having branched structure, since they are generally vitrifiable.

The polymerizable unsaturated monomer means a monomer having at least one $C = C$ or $C \equiv C$ group in the molecule. The nonpolymerizable organic compounds which are commercially available typically include acetone, methyl ketone, ethyl ether, tetrahydrofuran, acetonitrile, propionitrile, methyl alcohol, methyl acetate, ethyl acetate, chloroform and their homologues.

Incidentally, a combination of an organic acid and an amide can be applied to this invention, however, is not so advisable. A combination of an organic acid and an amine may form an intermolecular compound owing to their strong interaction such as hydrogen bond. The mixed system of an organic acid and amide increases in viscosity and surface tension of the system, tends to cause spontaneous polymerization, and is difficult to control the polymerization owing to too large polymerization rate. Therefore, an extreme care is required to take through the process of this invention.

Now, the invention is further illustrated by way of the working examples. It should be understood that the invention is not restricted by these examples and change and modification within the spirit and scope of this invention can be effected. The parts are based on mole ratio.

EXAMPLE 1

Methyl methacrylate (hereinafter referred to as MMA) has melting point of −48°C and estimated glass transition point of −135°C, the difference of which is 87°C. Incidentally, MMA is not vitrifiable by itself and its glass transition point can not be measured directly. Therefore, the glass transition point of MMA is estimated by dissolving MMA in a vitrifiable medium, measuring glass transition point of various MMA composition, and plotting the data on the graph. The term "estimated glass transition point" means thus estimated glass transition point.

Methyl acetate has melting point of −83°C and estimated glass transition point of −155°C, the difference of which is 72°C. MMA or methyl acetate is not vitrifiable by itself. The phase diagram of the various mixture of these components is shown in FIG. 1, in which — line represents melting points and — line represents glass transition points.

The shaded portion of FIG. 1 shows the area in which the temperature difference between melting point and glass transition point of the mixed system is 70°C or lower and the system can be vitrified. This composition ranges from about 0.05 to about 0.60 by mole ratio of MMA. 100 parts of MMA and 100 parts of methyl acetate was mixed, the glass transition point of this system being about −140°C. The mixed system was kept at −93°C and irradiated with $8 \times 10^5$ roentgen of gamma rays from Co-60 at the dose rate of $5 \times 10^4$ roentgen/hr, to obtain MMA polymer in 71% yield.

For the comparison, MMA was cooled at −93°C to form a crystallized state and it was irradiated under the same condition as the above to obtain no polymer. The mixture of 100 parts MMA and 100 parts methyl acetate was kept at −30°C, the system being at a nonviscous state, and irradiated under the same condition as the above to obtain MMA polymer in 14% yield.

The molecular weights of the polymers polymerized at −93°C and at −30°C are $4 \times 10^5$ and $7 \times 10^4$ respectively. The former is about 5.7 times of the latter in molecular weight and more than 1.5 times of the latter in mechanical strength.

EXAMPLE 2

Figure 2:
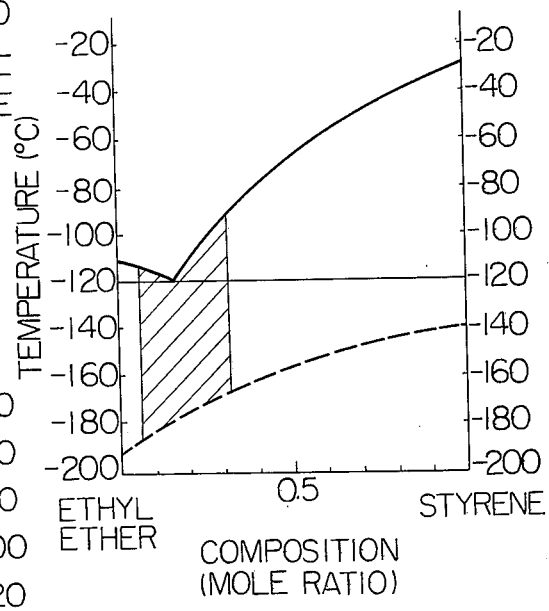

Styrene has melting point of −30°C and estimated glass transition point of −140°C, the difference of which is 110°C. Ethyl ether has melting point of −116°C and estimated glass transition point of −190°C, the difference of which is about 74°C. They are not vitrifiable by itself. The phase diagram of the various mixture of these component is shown in FIG. 2, in which — line represents melting points and - - - - line represents glass transition points. The composition in which mole ratio of styrene is about 0.03 – 0.35 is vitrifiable since the temperature difference between melting point and glass transition point is 70°C or lower in this composition range.

20 parts styrene and 80 parts ethyl ether were mixed, the glass transition point of this mixed system being about −170°C. The mixed system was irradiated with 1 × 10⁶ roentgen of gamma rays from cobalt 60 at −196°C at the dose rate of 2 × 10⁵ roentgen/hr, followed by polymerization for 5 hours at −110°C to obtain polystyrene in 49% yield.

For the comparison, 1 g of styrene was kept at −196°C and irradiated under the same condition as the above and then kept at −110°C for 5 hours, to obtain no polymer. The mixture of 20 parts styrene and 80 parts ethyl ether was kept at −30°C, the mixed system being at nonviscous state, and irradiated under the same condition as the above to obtain polystyrene only in 1.1% yield. The mixed system of the same composition was kept at −196°C and irradiated under the same condition as the above, and then kept at −63°C for 5 hours to obtain polystyrene only in 3% yield.

The molecular weight of the polymer polymerized at −110°C was about 2.5 times of that at −30°C and was superior in mechanical strength, transparency and thermal stability, etc.

EXAMPLE 3

Figure 3:
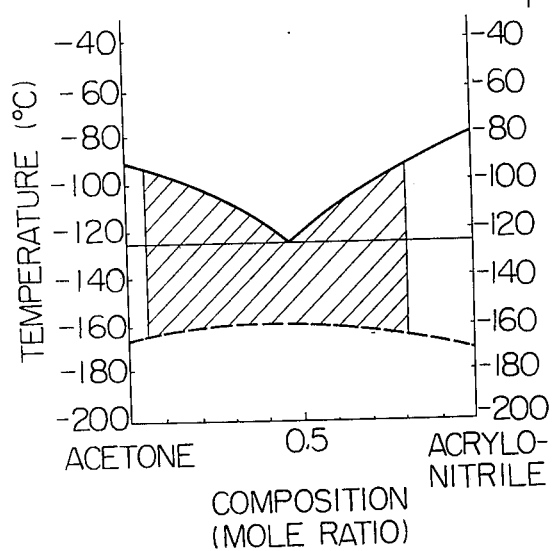

Acrylonitrile has melting point (MP) of −83°C and estimated glass transition point (GTP) of −170°C, the difference of which is 87°C. Acetone has MP of −94°C and estimated GTP of −165°C, the difference of which is 71°C. They are hardly vitrifiable by itself. FIG. 3 shows phase diagram of the mixed system of these components. The mixed system having composition range of 0.05 – 0.80 by mole ratio of acrylonitrile is vitrifiable since the temperature difference between MP and GTP is 70°C or lower.

The system was prepared by mixing 70 parts acrylonitrile and 30 parts acetone, GTP of this mixed system being about −165°C. The system was kept at −115°C and irradiated with 1.6 × 10⁵ roentgen of gamma rays from Co-60 at the dose rate of 1 × 10⁴ roentgen/hr, to obtain polyacrylonitrile in 93% yield. The mixture of the same composition was kept at −196°C, irradiated under the same conditions as the above, and then kept at −115°C for 6 hours to obtain polymer in 87% yield.

For the comparison, the mixture of the same composition was kept at −63°C, the mixture being at nonviscous state, and irradiated under the same condition as the above to obtain polymer in 18% yield. The molecular weight of the polymer polymerized at −115°C was about 4 times larger than that at −48°C.

EXAMPLE 4

Figure 4:
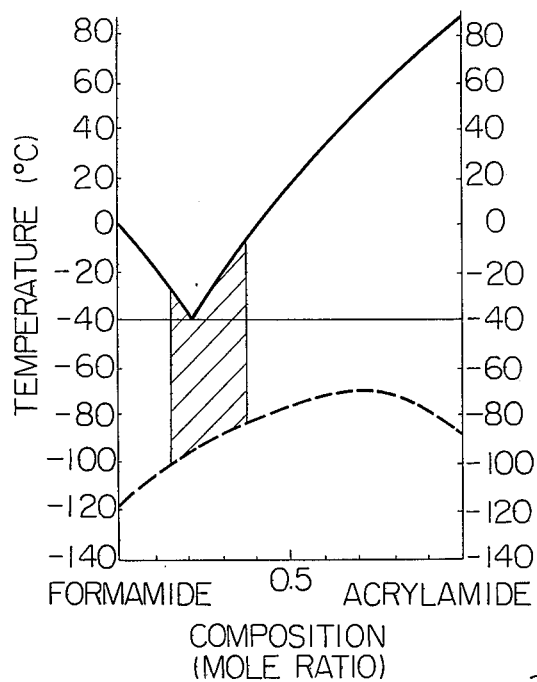

Acrylic amide has MP of 84°C and estimated GTP of −85°C, the difference of which is 169°C. Formamide has MP of 2°C and estimated GTP of −115°C, the difference of which is 117°C. They are not vitrifiable by itself. FIG. 4 shows the phase diagram of the mixed system of these components. As shown in the shaded portion of FIG. 4, the composition containing 0.15 – 0.40 by mole ratio of acrylonitrile forms a stable vitreous state.

The mixed system was prepared by dissolving uniformly 30 parts of acrylic amide and 70 parts of formamide, the GTP of the system being about −90°C. The mixed system was cooled and kept at −48°C, and irradiated at a distance of 10 cm with a high pressure mercury lamp (400 W) for 60 minutes to obtain acrylic amide polymer in 97% yield.

For the comparison, the mixture of the same composition was kept at 4°C, the mixed system being at non-viscous state, and irradiated with the same condition as the above to obtain polymer in 42% yield.

The polymer polymerized at −48°C was transparent, stiff and thermally stable, and superior in mechanical strength compared with the polymer polymerized at −30°C.

EXAMPLE 5

Figure 5:
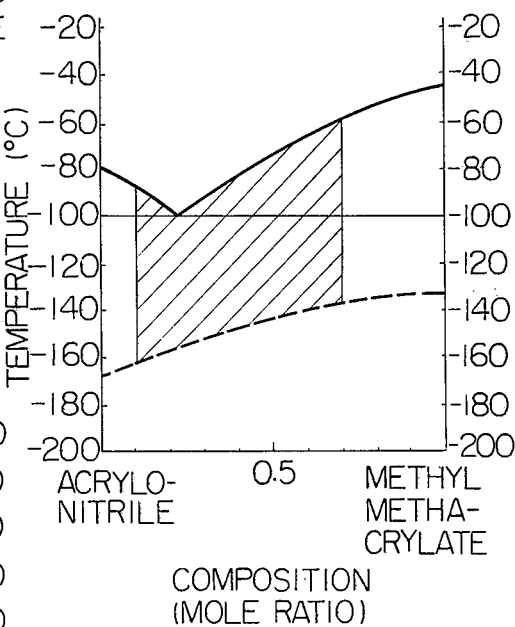
Figure 6:
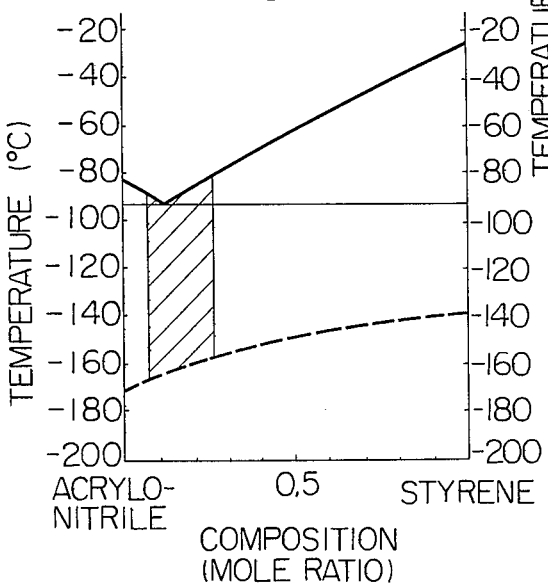

The phase diagrams of mixture of acrylonitrile and MMA and mixture of acrylonitrile and styrene are shown in FIG. 5 and FIG. 6 respectively.

As shown in the shaded portions of the figures, the mixture of acrylonitrile and MMA is vitrifiable in the range of 0.30 – 0.90 by mole ratio of acrylonitrile, and the mixture of acrylonitrile and styrene is vitrifiable in the range of 0.75 – 0.93 by mole ratio of acrylonitrile.

The mixed system was prepared by mixing 50 parts acrylonitrile and 50 parts of MMA, the GTP of the system ranging from −450° to −150°C. The system was kept at −110°C and took a nonviscous and semisolid state, and was irradiated with 5 × 10⁵ rad of electron beam of 2.5 MeV from electron accelerator to obtain the mixture of copolymer and homopolymer with the conversion rate of 98% of the total monomers.

The mixed system of 85 parts of acrylonitrile and 15 parts of styrene was prepared, the GTP of the system being about −160°C. The system was kept at −110°C and took a nonviscous state, and was irradiated under the same condition as the above. The conversion rate of the mixture of the resulting copolymer and homopolymer was 74% of the total monomers.

For the comparison, the mixture of acrylonitrile and MMA (50 : 50) was kept at −48°C and irradiated under the same condition. The conversion rate was only 19% of the total monomer. The mixture of acrylonitrile and styrene (85 : 15) was kept at −60°C and irradiated under the same condition. The conversion rate was 7%. The above-mentioned mixed systems were kept at 25°C and irradiated under the same condition as the above. The both systems exhibited violent uncontrolled reactions owing to the accumulation of large polymerization heat.

What we claim is:

1. A process for preparing a resinous polymer at a low temperature which, in spite of the low temperature, can be carried out at a high polymerization rate, comprising:
   1. uniformly mixing two or more organic compounds neither of which is vitrifiable independently and at least one of which is a polymerizable unsaturated monomer, said compounds being mixed in such a ratio as to give a vitrifiable mixture having a glass-transition point and a melting point, and having a temperature difference between said glass-transition point and said melting point of 70°C. or less; and
   2. effecting polymerization by irradiating the mixture with an ionizing radiation or light at a temperature between said glass-transition point and 100°C. above said glass-transition point.

2. A process for preparing a resinous polymer at a low temperature which, in spite of the low temperature, can be carried out at a high polymerization rate, comprising:
   1. uniformly mixing two or more organic compounds neither of which is vitrifiable independently and at least one of which is a polymerizable unsaturated monomer, said compounds being mixed in such a ratio as to give a vitrifiable mixture having a glass-transition point and a melting point, and having a temperature difference between said glass-transition point and said melting point of 70°C. or less;
   2. irradiating said mixture with an ionizing radiation or light while maintaining said mixture at a temperature below said glass-transition point; and
   3. raising the temperature and maintaining the temperature between said glass-transition point and 100°C. above said glass-transition point to carry out polymerization of the irradiated mixture.

3. A process according to claim 1, in which the dose rate of the ionizing radiation is about $10^2 - 10^9$ roentgens/hr and the total dose thereof is about $10^2 - 10^7$ roentgens.

4. A process according to claim 2, in which the dose rate of the ionizing radiation is about $10^2 - 10^9$ roentgens/hr and the total dose thereof is about $10^2 - 10^7$ roentgens.

5. A process according to claim 1, in which the wave length of the light is about 1,900 – 7,000 A.

6. A process according to claim 2, in which the wave length of the light is about 1,900 – 7,000 A.

7. A process according to claim 3, in which the wave length of the light is about 1,900 – 7,000 A.

8. A process according to claim 4, in which the wave length of the light is about 1,900 – 7,000 A.

9. A process according to claim 1, in which the polymerizable unsaturated monomer is selected from the group consisting of styrene, methyl methacrylate, methyl acrylate, ethyl acrylate, butyl acrylate, butyl methacrylate, vinyl toluene, vinyl pyridine, vinyl pyrrolidone, vinyl carbazole, acrylic acid, acrylic amide, methacrylic acid, methacrylic amide, methylolated acrylic amide, methylene bis-acrylic amide, methacrylonitrile, acrylonitrile, vinyl acetate, vinyl chloride, vinylidene chloride, butadiene, acetylene, isoprene, isobutylene, divinyl benzene, triallyl cyanurate, diallyl maleate, diallyl itaconate, itaconic acid, acenaphthylene, vinyl stearate, vinyl laurate, isopropenyl methyl ketone, vinyl methyl ketone and homologues of these monomers.

10. A process according to claim 2, in which the polymerizable unsaturated monomer is selected from the group consisting of styrene, methyl methacrylate, methyl acrylate, ethyl acrylate, butyl acrylate, butyl methacrylate, vinyl toluene, vinyl pyridine, vinyl pyrrolidone, vinyl carbazole, acrylic acid, acrylic amide, methacrylic acid, methacrylic amide, methylolated acrylic amide, methylene bis-acrylic amide, methacrylonitrile, acrylonitrile, vinyl acetate, vinyl chloride, vinylidene chloride, butadiene, acetylene, isoprene, isobutylene, divinyl benzene, triallyl cyanurate, diallyl maleate, diallyl itaconate, itaconic acid, acenaphthylene, vinyl stearate, vinyl laurate, isopropenyl methyl ketone, vinyl methyl ketone and homologues of these monomers.

11. A process according to claim 7, in which the polymerizable unsaturated monomer is selected from the group consisting of styrene, methyl methacrylate, methyl acrylate, ethyl acrylate, butyl acrylate, butyl methacrylate, vinyl toluene, vinyl pyridine, vinyl pyrrolidone, vinyl carbazole, acrylic acid, acrylic amide, methacrylic acid, methacrylic amide, methylolated acrylic amide, methylene bis-acrylic amide, methacrylonitrile, acrylonitrile, vinyl acetate, vinyl chloride, vinylidene chloride, butadiene, acetylene, isoprene, isobutylene, divinyl benzene, triallyl cyanurate, diallyl maleate, diallyl itaconate, itaconic acid, acenaphthylene, vinyl stearate, vinyl laurate, isopropenyl methyl ketone, vinyl methyl ketone and homologues of these monomers.

12. A process according to claim 8, in which the polymerizable unsaturated monomer is selected from the group consisting of styrene, methyl methacrylate, methyl acrylate, ethyl acrylate, butyl acrylate, butyl methacrylate, vinyl toluene, vinyl pyridine, vinyl pyrrolidone, vinyl carbazole, acrylic acid, acrylic amide, methacrylic acid, methacrylilc amide, methylolated acrylic amide, methylene bis-acrylic amide, methacrylonitrile, acrylonitrile, vinyl acetate, vinyl chloride, vinylidene chloride, butadiene, acetylene, isoprene, isobutylene, divinyl benzene, triallyl cyanurate, diallyl maleate, diallyl itaconate, itaconic acid, acenaphthylene, vinyl stearate, vinyl laurate, isopropenyl methyl ketone, vinyl methyl ketone and homologues of these monomers.

* * * * *